United States Patent
Hsieh

(10) Patent No.: US 12,154,281 B2
(45) Date of Patent: Nov. 26, 2024

(54) DEVICE AND METHOD FOR DETECTING MOVEMENT OF OBJECT IN IMAGES

(71) Applicant: Sigmastar Technology Ltd., Xiamen (CN)

(72) Inventor: Ning-Ching Hsieh, Hsinchu County (TW)

(73) Assignee: SIGMASTAR TECHNOLOGY LTD., Xiamen (CN)

( * ) Notice: Subject to any disclaimer, the term of this patent is extended or adjusted under 35 U.S.C. 154(b) by 399 days.

(21) Appl. No.: 17/683,746

(22) Filed: Mar. 1, 2022

(65) Prior Publication Data

US 2022/0405944 A1   Dec. 22, 2022

(30) Foreign Application Priority Data

Jun. 16, 2021   (CN) .................. 202110666153.X

(51) Int. Cl.
*G06T 7/246*    (2017.01)
*G06T 5/50*     (2006.01)

(52) U.S. Cl.
CPC ............. *G06T 7/248* (2017.01); *G06T 5/50* (2013.01); *G06T 2207/20036* (2013.01); *G06T 2207/20221* (2013.01); *G06T 2207/20224* (2013.01)

(58) Field of Classification Search
CPC ........... G06T 5/50; G06T 7/215; G06T 7/248; G06T 2207/20021; G06T 2207/20036; G06T 2207/20221; G06T 2207/20224; H04N 5/144
See application file for complete search history.

(56) References Cited

U.S. PATENT DOCUMENTS

| | | | |
|---|---|---|---|
| 9,584,814 B2* | 2/2017 | Socek | H04N 19/186 |
| 2015/0097959 A1* | 4/2015 | Hu | H04N 5/76 348/155 |
| 2019/0020894 A1* | 1/2019 | Peng | H04N 19/523 |

OTHER PUBLICATIONS

Montero et al. "Fast background subtraction with adaptive block learning using expectation value suitable for real-time moving object detection." Journal of Real-Time Image Processing 18 (2021): 967-981. (Year: 2021).*
Roichman et al. "Real-Time pedestrian detection and tracking." Proceedings of 3rd European DSP Education and Research Symposium (EDERS). 2008. (Year: 2008).*

* cited by examiner

*Primary Examiner* — Katrina R Fujita
(74) *Attorney, Agent, or Firm* — WPAT, P.C

(57) ABSTRACT

A device for detecting the movement of object in images includes a weight determination circuit, an image blending circuit, and an object movement detection circuit. The weight determination circuit determines multiple weights according to an input image and a background image, each weight corresponding to a pixel position. The image blending circuit blends the input image and the background image based on the weights to generate an updated background image. The object movement detection circuit performs a sum of absolute difference (SAD) calculation, block by block, with the input image and the background image or the updated background image to generate a moving object indication data. The object movement detection circuit generates an object movement signal according to the moving object indication data and at least one threshold. Each block contains multiple pixels.

18 Claims, 10 Drawing Sheets

|       | n=0 | n=1 | n=2 | n=3 |
|-------|-----|-----|-----|-----|
| m=0   | 0   | 0   | 0   | 0   |
| m=1   | 0   | 0   | 0   | 0   |
| m=2   | 0   | 1   | 1   | 1   |
| m=3   | 0   | 1   | 1   | 0   |

FIG. 4A

|       | n=0 | n=1 | n=2 | n=3 |
|-------|-----|-----|-----|-----|
| m=0   | 0   | 0   | 0   | 0   |
| m=1   | 0   | 1   | 1   | 0   |
| m=2   | 0   | 1   | 1   | 0   |
| m=3   | 0   | 0   | 0   | 0   |

FIG. 4B

DEVICE AND METHOD FOR DETECTING MOVEMENT OF OBJECT IN IMAGES

This application claims the benefit of China application Serial No. CN 202110666153.X, filed Jun. 16, 2021, the subject matter of which is incorporated herein by reference.

BACKGROUND OF THE INVENTION

1. Field of the Invention

The present invention generally relates to image processing, and, more particularly, to methods and devices for detecting the movement of object in images.

2. Description of Related Art

For security monitoring systems, having the capability of accurately detecting and determining whether there is moving object in the images is very important. Since the security monitoring system identifies moving object by comparing the current image with the previous image, the performance and sensitivity of the security monitoring system are highly dependent on the methods of generating the previous images and identifying the moving object. Misjudgments (false alarms or missed alarms) are common in the conventional security monitoring systems as a result of improper process of the previous images or inaccurate identification of moving object. Therefore, there is a need to provide a method and device for detecting the movement of object in images to improve the reliability of the security monitoring system.

SUMMARY OF THE INVENTION

In view of the issues of the prior art, an object of the present invention is to provide a device and method of detecting the movement of object in images, so as to make an improvement to the prior art.

According to one aspect of the present invention, a device for detecting the movement of object in images is provided. The device includes a weight determination circuit, an image blending circuit, and an object movement detection circuit. The weight determination circuit determines multiple weights according to an input image and a background image, each weight corresponding to a pixel position. The image blending circuit, coupling to the weight determination circuit, blends the input image and the background image based on the weights to generate an updated background image. The object movement detection circuit, coupling to the image blending circuit, performs a sum of absolute difference (SAD) calculation with the input image and the background image or the updated background image block by block and generates a moving object indication data, and generates an object movement signal according to the moving object indication data and at least one threshold. Each block contains multiple pixels.

According to another aspect of the present invention, a method of detecting the movement of object in images is provided. The method includes the following steps: (A) determining multiple weights according to an input image and a background image, each weight corresponding to a pixel position; (B) blending the input image and the background image based on the weights to generate an updated background image; (C) performing a sum of absolute difference (SAD) calculation on the input image and the background image or the updated background image block by block to generate a moving object indication data; and (D) generating an object movement signal according to the moving object indication data and at least one threshold. Each block contains multiple pixels.

These and other objectives of the present invention no doubt become obvious to those of ordinary skill in the art after reading the following detailed description of the preferred embodiments with reference to the various figures and drawings.

BRIEF DESCRIPTION OF THE DRAWINGS

FIG. 4A illustrates an example of the moving object indication data MOI.

FIG. 4B illustrates a schematic diagram of the mask according to an embodiment.

DETAILED DESCRIPTION OF THE EMBODIMENTS

The following description is written by referring to terms of this technical field. If any term is defined in this specification, such term should be interpreted accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes devices and methods for detecting the movement of object in images. On account of that some or all elements of the devices for detecting the movement of object in images could be known, the detail of such elements is omitted provided that such detail has little to do with the features of this disclosure, and that this omission nowhere dissatisfies the specification and enablement requirements. Some or all of the processes of the methods of detecting the movement of object in images may be implemented by software and/or firmware, and can be performed by the devices for detecting the movement of object in images. A person having ordinary skill in the art can choose components or steps equivalent to those described in this specification to carry out the present invention, which means that the scope of this invention is not limited to the embodiments in the specification.

Figure 1:
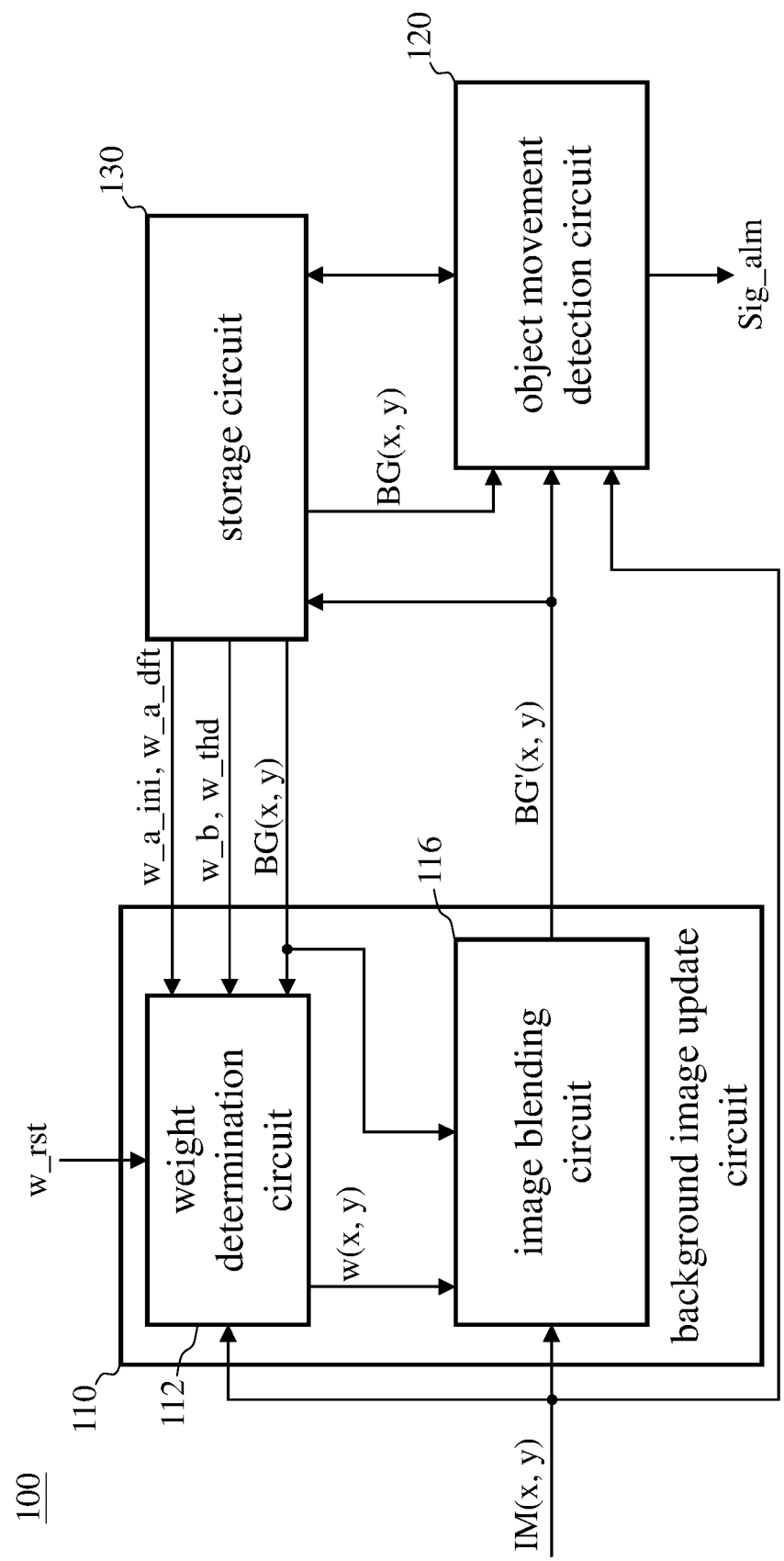
FIG. 1 illustrates a functional block diagram of a device for detecting the movement of object in images according to an embodiment of the present invention.
Figure 2:
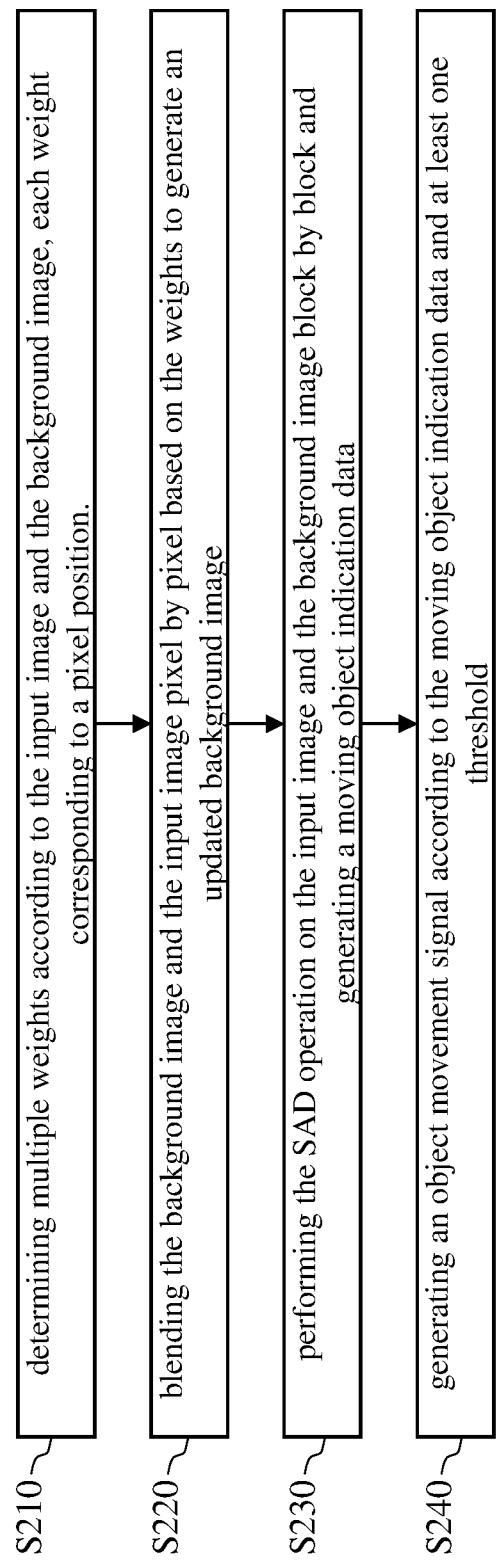
FIG. 2 illustrates a flowchart of the method of detecting the movement of object in images according to an embodiment of the present invention.

FIG. 1 is a functional block diagram of a device for detecting the movement of object in images according to an embodiment of the present invention. The device 100 for detecting the movement of object in images includes a background image updating circuit 110, an object movement detection circuit 120, and a storage circuit 130. The storage circuit 130 may include a register, a random-access memory, and/or a buffer. The background image updating circuit 110 includes a weight determination circuit 112 and an image blending circuit 116. FIG. 2 is a flowchart of the method of detecting the movement of object in images according to an embodiment of the present invention. The method includes the following steps.

Step S210: determining, by the weight determination circuit 112, multiple weights w(x,y) (where "(x,y)" represents the coordinates of the pixel) according to the input image IM and the background image BG, each weight corresponding to a pixel position. The details of step S210 will be elaborated in FIG. 5.

Step S220: blending, by the image blending circuit 116, the background image BG and the input image IM pixel by pixel based on the weights to generate an updated background image BG'. The generated updated background image BG' is stored in the storage circuit 130 and will be used as the background image BG of the next round (when there is a new input image IM). More specifically, the image blending circuit 116 generates the updated background image BG' (0≤w(x,y)≤1) according to the following equation.

$$BG'(x,y)=w(x,y)*IM(x,y)+(1-w(x,y))*BG(x,y) \quad (1)$$

wherein IM(x,y) is the pixel value of the input image IM at the pixel position (x,y), and BG(x,y) is the pixel value of the background image BG at the pixel position (x,y). In practice, if each pixel value is represented by eight bits, the values of IM(x,y), BG(x,y), w(x,y) and BG'(x,y) are all between zero and 255, and equation (1) can be modified to equation (2):

$$BG'(x,y)=(w(x,y)*IM(x,y)+(2^8-w(x,y))*BG(x,y)+2^7)>>8 \quad (2)$$

wherein adding $2^7$ and shifting by eight bits represents the rounding operation. People having ordinary skill in the art can understand the implementation details of the equation (2) and how to modify the equation (1) for cases where the pixel values are not eight bits. Therefore, the details are omitted for brevity.

Figure 3:
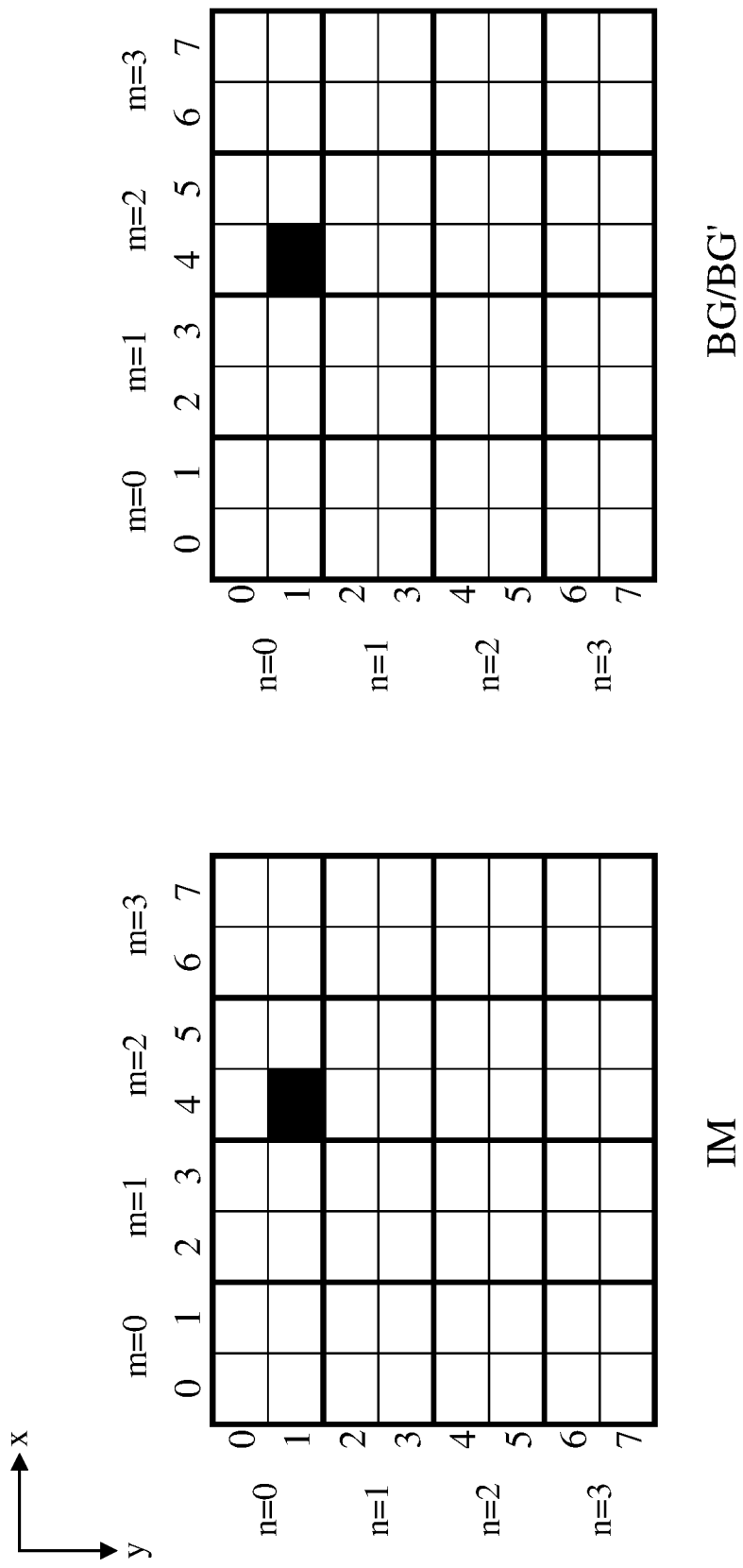
FIG. 3 illustrates a schematic diagram of the input image IM and the background image BG (or the updated background image BG').

Step S230: performing, by the object movement detection circuit 120, the sum of absolute difference (SAD) calculation on the input image and the background image (which can be the background image BG or the updated background image BG') block by block, and generating a moving object indication data. In this step, the calculation is performed in units of blocks. Reference is made to FIG. 3, which shows a schematic diagram of the input image IM and the background image BG (or the updated background image BG'). An image can be a picture or a frame. In the example of FIG. 3, an image contains 64 pixels ((x,y), 0≤x≤7, 0≤y≤7) and 16 blocks ((m,n), 0≤m≤3, 0≤n≤3), a block containing four pixels. In other words, the object movement detection circuit 120 performs the SAD calculation on each block according to equation (3) (the background image being the background image BG) or equation (4) (the background image being the updated background image BG'), and a total of 16 SAD values are generated (SAD(m,n), 0≤m≤3, 0≤n≤3).

$$SAD(m,n)=\Sigma_{j=0}^{bs\_y-1}\Sigma_{i=0}^{bs\_x-1}abs(IM(bs\_x*m+i,bs\_y*n+j)-BG(bs\_x*m+i,bs\_y*n+j)) \quad (3)$$

$$SAD(m,n)=\Sigma_{j=0}^{bs\_y-1}\Sigma_{i=0}^{bs\_x-1}abs(IM(bs\_x*m+i,bs\_y*n+j)-BG'(bs\_x*m+i,bs\_y*n+j)) \quad (4)$$

wherein bs_x represents the number of pixels that a block has on the x-axis, and bs_y represents the number of pixels that a block has on the y-axis, that is, the size of a block is bs_x*bs_y. In the example of FIG. 3, bs_x=bs_y=2.

Then, the object movement detection circuit 120 generates the moving object indication data MOI according to all the SAD values in the image and the first threshold sad_thd. More specifically, the object movement detection circuit 120 compares SAD(m,n) with the first threshold sad_thd block by block according to equation (5) to obtain the comparison result CR, and the comparison results CR of all blocks form the moving object indication data MOI.

$$CR = \begin{cases} 1, \text{when } SAD(m,n) > \text{sad\_th} \\ 0, \text{when } SAD(m,n) \leq \text{sad\_th} \end{cases} \quad (5)$$

Reference is made to FIG. 4A which shows an example of the moving object indication data MOI. The comparison results CR of the blocks (2,1), (3,1), (2,2), (3,2) and (2,3) are 1, which means there may be moving object(s) in this region of the image.

Step S240: generating, by the object movement detection circuit 120, an object movement signal Sig_alm according to the moving object indication data MOI and at least one threshold. For example, the object movement detection circuit 120 can determine the value of the object movement signal Sig_alm according to equation (6) or equation (7).

$$Sig\_alm = \begin{cases} 1, \text{when } N\_moi > \text{alm\_thd1} \\ 0, \text{when } N\_moi \leq \text{alm\_thd1} \end{cases} \quad (6)$$

$$Sig\_alm = \begin{cases} 1, \text{when alm\_thd2} > N\_moi > \text{alm\_thd1} \\ 0, \text{others} \end{cases} \quad (7)$$

wherein N_moi is the number of blocks whose comparison result CR is 1 (in the example of FIG. 4A, N_moi=5), and alm_thd1 and alm_thd2 are thresholds. Here, the user can avoid noise-triggered false positives by setting the value of the threshold alm_thd1 in a way that the comparison result being 1 indicates a significant difference and thus the presence of moving object(s). Further, by setting the value of the threshold alm_thd2, the user can exclude the error messages that may be caused by the large change in the brightness due to the switching of lights, so as to avoid misjudgment. The object movement signal Sig_alm being 1 means that the object movement detection circuit 120 has detected the presence of the moving object(s) in the input image IM, and that the characteristics (such as size) of the moving object(s) meet the condition(s) set by the user.

Figure 5:
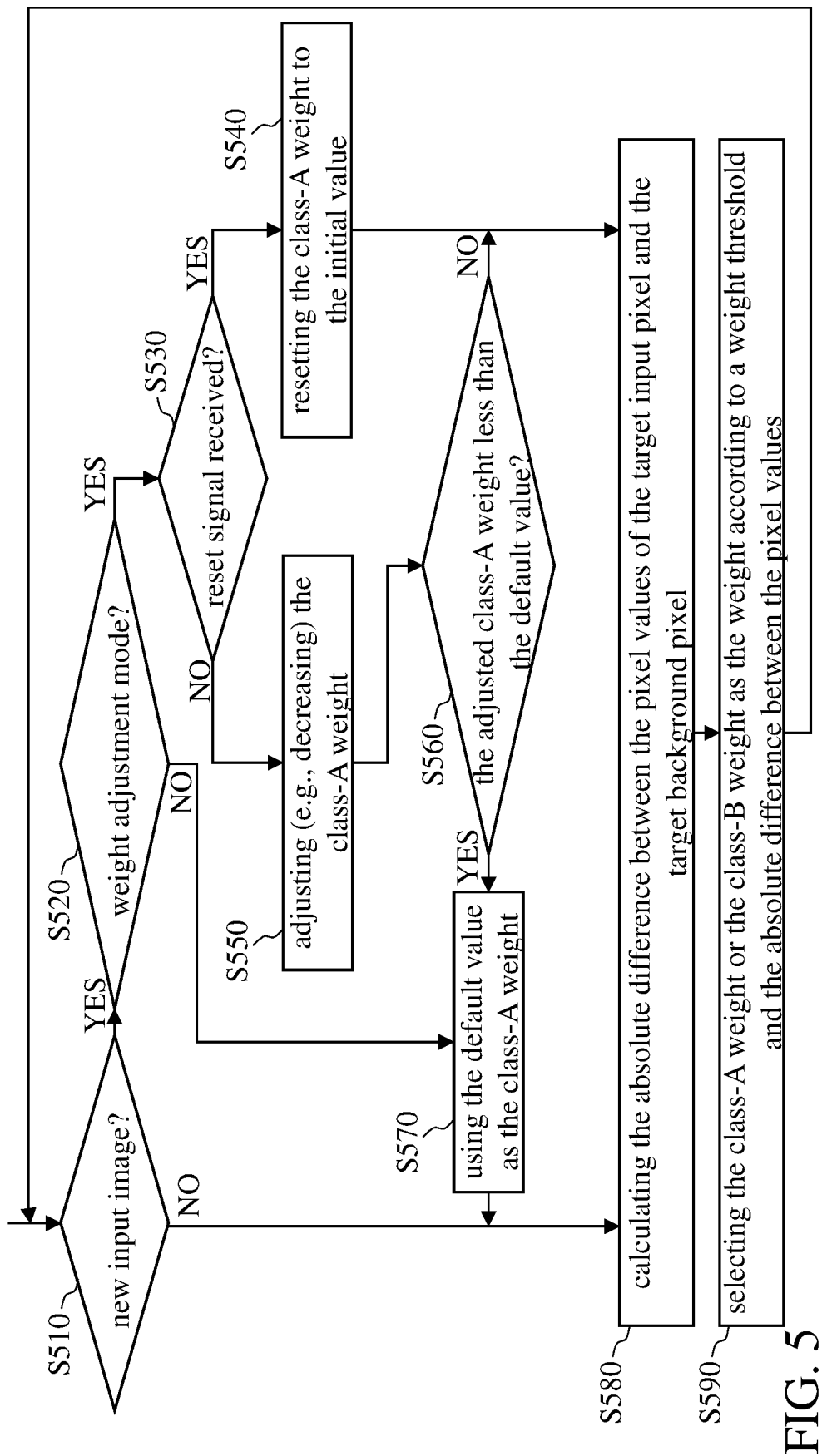
FIG. 5 illustrates a flowchart of step S210 in FIG. 2 according to an embodiment.

FIG. 5 is a flowchart of step S210 according to an embodiment. Step S210 includes steps S510 to S590. The weight determination circuit 112 calculates the absolute difference between the pixel values of two pixels (one of which is the target input pixel and the other of which is the target background pixel) corresponding to a target pixel position (step S580), and classifies the target pixel position as class A (whose weight w(x,y) is the class-A weight w_a)

or class B (whose weight w(x,y) is the class-B weight w_b) based on the weight threshold w_thd and the absolute difference between the pixel values (step S590). The weight determination circuit 112 determines whether to adjust the class-A weight w_a (steps S530 to S570) according to whether itself is operating in the weight adjustment mode (step S520) and whether the input image IM is updated (step S510). Reference is made to FIG. 3. The target pixel position is represented by a set of (x,y) value (e.g., the pixel position (4,1) marked black in FIG. 3), the target input pixel is the pixel of the input image IM at that position (the pixel value of which is IM(x,y), which is IM(4,1) in the example of FIG. 3), and the target background pixel is the pixel of the background image BG at same position (the pixel value of which is BG(x,y), which is BG(4,1) in the example of FIG. 3).

The details of steps S510 to S590 are as follows.

Step S510: determining, by the weight determination circuit 112, whether the input image IM is a new input image. Specifically, the weight determination circuit 112 determines whether the currently input pixel data corresponds to the first pixel of the input image IM by determining whether the currently input pixel data belongs to the new input image. In some embodiments, the weight determination circuit 112 knows whether the end of the previous input image IM and/or the start of the new input image IM has been reached by counting the number of pixels. If the result of step S510 is YES (i.e., the input image has been updated), the weight determination circuit 112 performs step S520; otherwise, the weight determination circuit 112 performs step S580.

Step S520: determining, by the weight determination circuit 112, whether itself or the background image updating circuit 110 is operating in the weight adjustment mode. If the result of step S520 is YES (i.e., in the weight adjustment mode), the weight determination circuit 112 adjusts the class-A weight w_a according to the default value w_a_dft and whether the reset signal w_rst is received (steps S530 to S570); otherwise, the weight determination circuit 112 performs step S570.

Step S530: determining, by the weight determination circuit 112, whether the reset signal w_rst is received. If the result of step S530 is YES, the weight determination circuit 112 performs step S540; otherwise, the weight determination circuit 112 performs step S550. When and how to generate the reset signal w_rst will be detailed below in connection with FIG. 10.

Step S540: resetting, by the weight determination circuit 112, the class-A weight w_a to the initial value w_a_ini, and then performing step S580.

Step S550: adjusting, by the weight determination circuit 112, the class-A weight. For example, each time the weight determination circuit 112 performs step S550, it subtracts a step value from the class-A weight w_a.

Step S560: determining, by the weight determination circuit 112, whether the adjusted class-A weight w_a is less than the default value w_a_dft. The default value w_a_dft can be stored in the storage circuit 130. If the result of step S560 is YES, the weight determination circuit 112 performs step S570; otherwise, the weight determination circuit 112 performs step S580.

Step S570: using, by the weight determination circuit 112, the default value w_a_dft as the class-A weight w_a.

Step S580: calculating, by the weight determination circuit 112, the absolute difference Px_d between the pixel values of the target input pixel and the target background pixel (Px_d=abs(IM(x,y)−BG(x,y))).

Step S590: selecting, by the weight determination circuit 112, the class-A weight w_a or the class-B weight w_b as the weight w(x,y) corresponding to the target pixel position according to the weight threshold w_thd and the absolute difference Px_d between the pixel values. In some embodiments, when the absolute difference Px_d between the pixel values is greater than the weight threshold w_thd, the target pixel position is classified as class A, which means that the change at the target pixel position between the input image IM and the background image BG is relatively large (which may be caused by moving object(s)); when the absolute difference Px_d between the pixel values is not greater than the weight threshold w_thd, the target pixel position is classified as class B, which means that the change at the target pixel position between the input image IM and the background image BG is relatively small.

In some embodiments, the default value w_a_dft is smaller than the class-B weight w_b. For example, the default value w_a_dft can be 0.25 (or 64 when the pixel value is represented by eight bits), and the class-B weight w_b can be 0.5 (or 128 when the pixel value is represented by eight bits).

In a case where the first input image IM (which will become the first background image BG) after the device 100 is started contains a moving object, the weight of the first input image IM in the background should be set smaller (i.e., the weight of the new input image IM should be set greater), so as to avoid the persistent presence of the moving object in the background (which may cause misjudgment by the device 100). The weight adjustment mode (i.e., steps S530 to S570) is aimed to deal with this case. The initial value w_a_ini of step S540 is greater than the default value w_a_dft of steps S560 and S570. For example, the initial value w_a_ini can be 128, and the default value w_a_dft can be 32; therefore, after the device 100 is started or the weight determination circuit 112 receives the reset signal w_rst, the weight that the weight determination circuit 112 assigns to the positions of the class-A pixels (i.e., the class-A weight w_a) is initially 128 (i.e., the initial value w_a_ini), and then decreases until it is equal to 32 (i.e., the default value w_a_dft). In another embodiment, when the weight adjustment mode is turned on, for the first input image IM after the device 100 is started or the first input image IM after the reset signal w_rst is received, the class-A weight w_a can be set to the initial value w_a_ini. Afterwards, whenever an input image IM is updated (i.e., a new input image IM has entered), the result of subtracting a fixed value (e.g., 16) from the current class-A weight w_a is used as the adjusted class-A weight w_a. After a certain number of adjustments (e.g., six times), the class-A weight w_a becomes a fixed value. In the previous embodiment, the weight adjustment mode is illustrated by the example of gradually decreasing the class-A weight w_a. However, similar effects can be achieved by gradually increasing the class-B weight w_b. In general, after the device 100 is stated or after the weight determination circuit 112 receives the reset signal w_rst, when the weight adjustment mode is turned on, there is a period of time for the weight determination circuit 112 to adjust the class-A weight w_a or class-B weight w_b.

Figure 6:
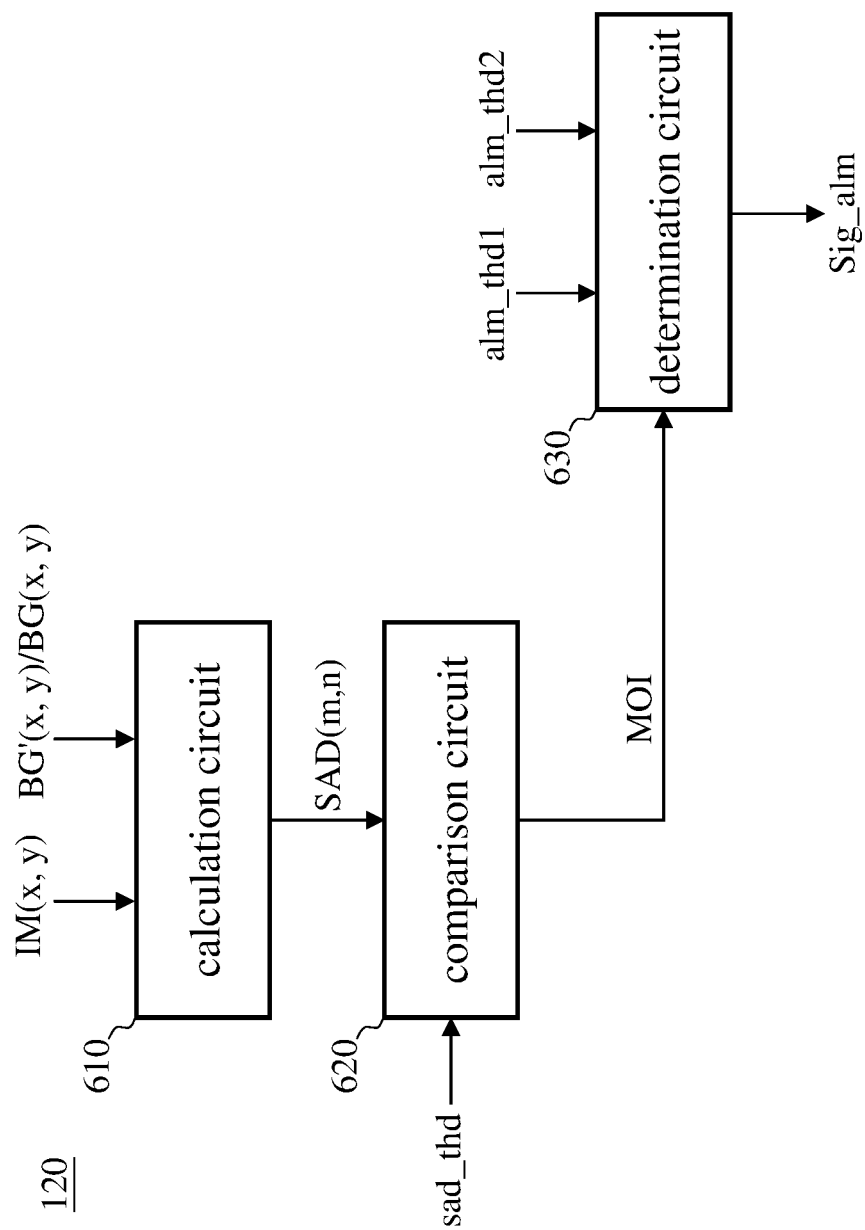
FIG. 6 illustrates a functional block diagram of the object movement detection circuit 120 according to an embodiment.
Figure 7:
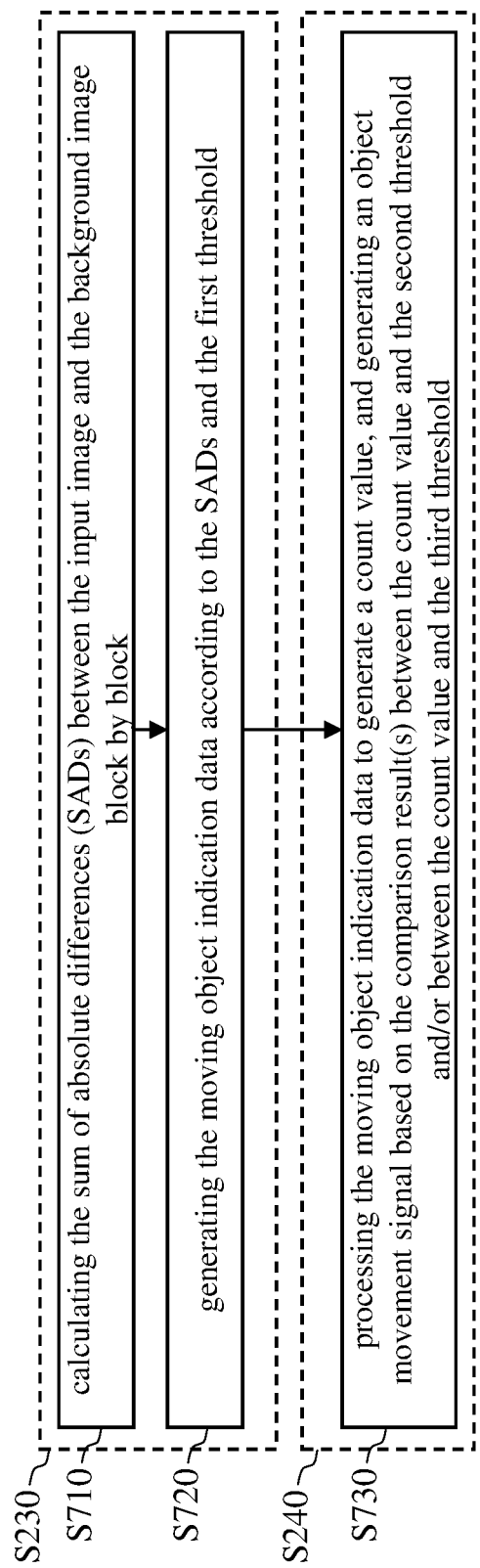
FIG. 7 illustrates the sub-steps of step S230 and the sub-steps of step S240.

FIG. 6 is a functional block diagram of the object movement detection circuit 120 according to an embodiment. The object movement detection circuit 120 includes a calculation circuit 610, a comparison circuit 620, and a determination circuit 630. FIG. 7 shows sub-steps S710 and S720 of step S230 and sub-step S730 of step S240.

Step S710: calculating, by the calculation circuit 610, the sum of absolute differences SAD(m,n) between the input image IM and the background image block by block. Please refer to equation (3) or (4) and the discussions of step S230 for details.

Step S720: generating, by the comparison circuit 620, the moving object indication data MOI according to the SADs and the first threshold sad_thd. Please refer to equation (5), FIG. 4A and related discussions.

Step S730: processing, by the determination circuit 630, the moving object indication data to generate a statistic value, and generating an object movement signal Sig_alm based on the comparison result(s) between the statistic value and the second threshold alm_thd1 and/or between the statistic value and the third threshold alm_thd2. More specifically, the determination circuit 630 counts, in the moving object indication data MOI, the number of blocks whose comparison result CR is one. In the example of FIG. 4A, the determination circuit 630 obtains a statistic value of five. Next, the determination circuit 630 compares the statistic value with the second threshold alm_thd1, or compares the statistic value with the second threshold alm_thd1 and the third threshold alm_thd2. Please refer to equation (6) or (7) and the discussion of step S240 for details.

Figure 8:
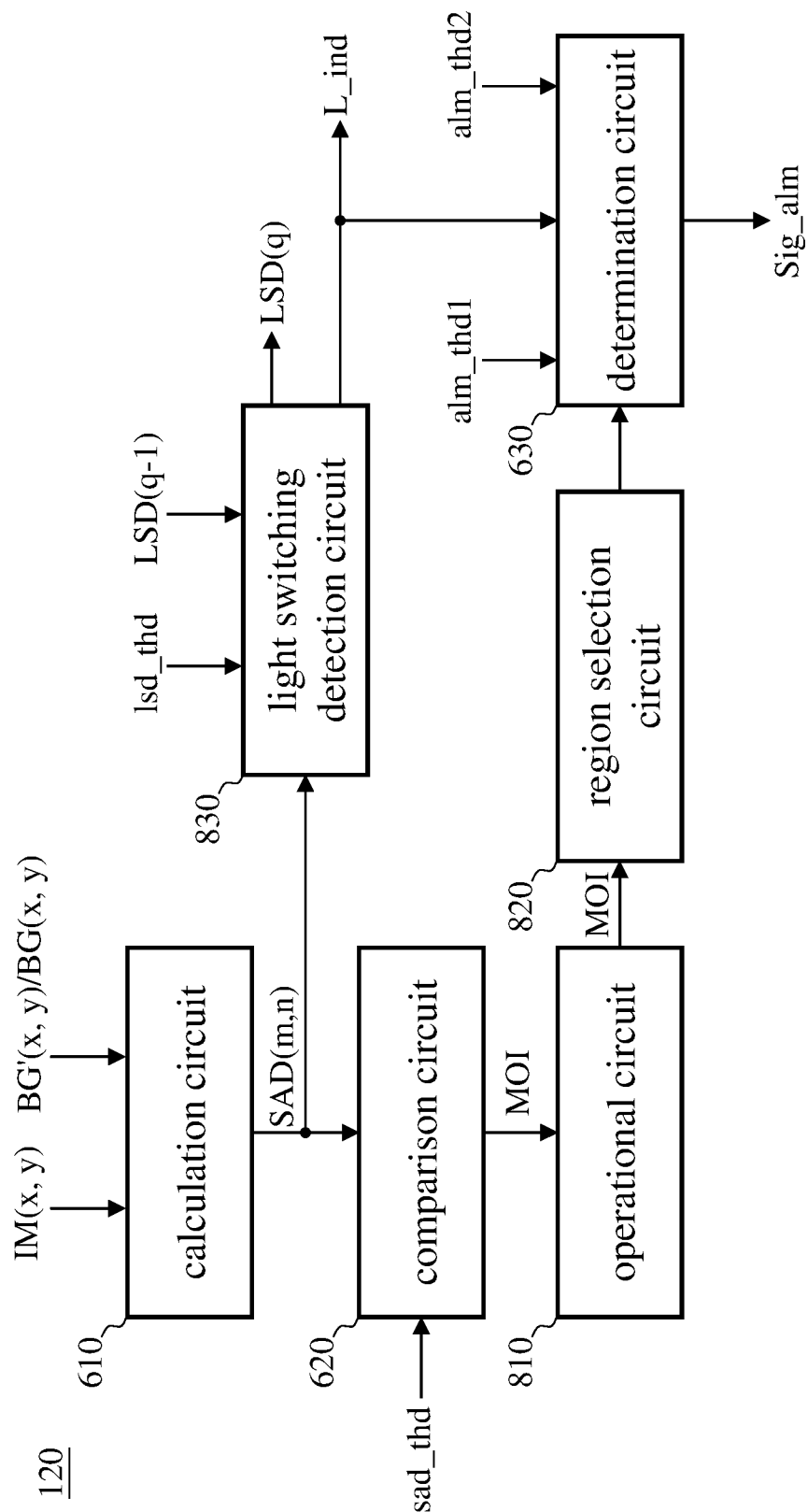
FIG. 8 illustrates a functional block diagram of the object movement detection circuit 120 according to another embodiment.
Figure 9:
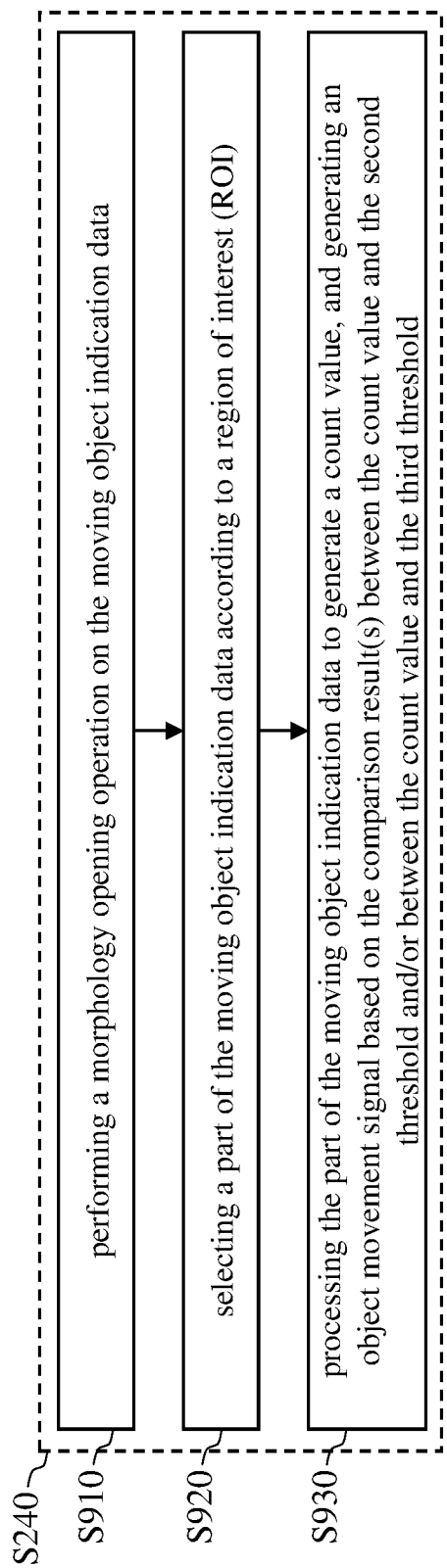
FIG. 9 illustrates the sub-steps of step S240.

FIG. 8 is a functional block diagram of the object movement detection circuit 120 according to another embodiment. The object movement detection circuit 120 includes the calculation circuit 610, the comparison circuit 620, the determination circuit 630, an operation circuit 810, a region selection circuit 820, and a light switching detection circuit 830. FIG. 9 shows sub-steps S910 to S930 of step S240.

Step S910: performing, by the operation circuit 810, a morphology opening operation on the moving object indication data MOI. In addition to smoothing the edges of the moving object indication data MOI, the morphology opening operation can also eliminate moving objects that are relatively small in the moving object indication data MOI and/or make the boundary between the moving objects clearer.

Step S920: selecting, by the region selection circuit 820, a part of the moving object indication data MOI according to a region of interest (ROI). Specifically, the region selection circuit 820 uses a mask to extract a part of the moving object indication data MOI by finding the intersection between the mask and the moving object indication data MOI. For example, FIG. 4B shows a schematic diagram of the mask according to an embodiment. As shown in FIG. 4B, the region of interest is represented by 1 (i.e., the value of block (1,1), block (2,1), block (1,2), and block (2,2) is 1, whereas the value of other blocks is 0); in other words, the region of interest is the center part of the image. As shown in FIGS. 4A and 4B, the region selection circuit 820 processes the moving object indication data MOI in units of blocks.

Step S930: processing, by the determination circuit 630, the part of the moving object indication data to generate a statistic value, and generating an object movement signal Sig_alm based on the comparison result(s) between the statistic value and the second threshold alm_thd1 and/or between the statistic value and the third threshold alm_thd2. This step is similar to step S730, except that in step S930 the determination circuit 630 processes only the part of the moving object indication data MOI corresponding to the region of interest.

Figure 10:
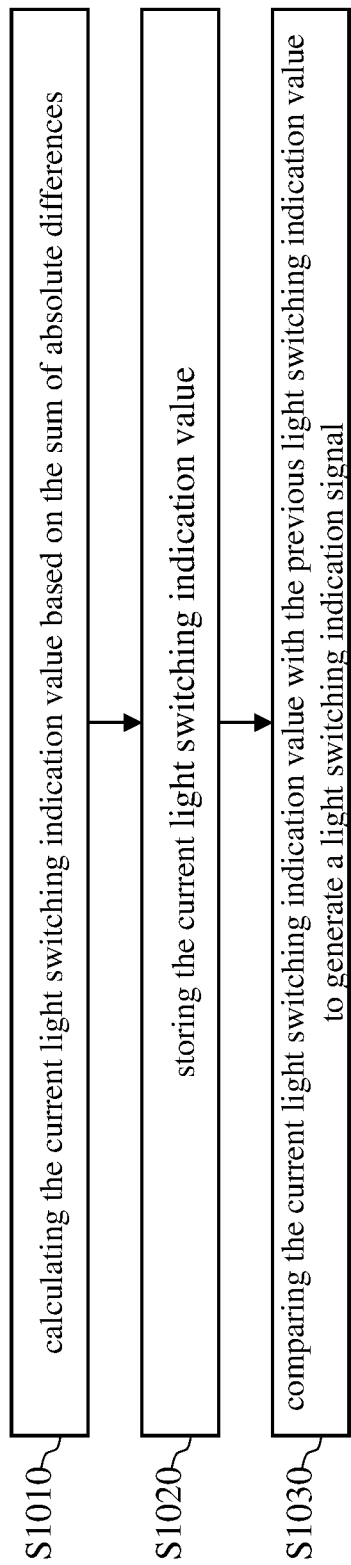
FIG. 10 illustrates a flowchart of detecting light switching in images according to an embodiment of the present invention.

The light switching detection circuit 830 is discussed in connection with FIG. 10. FIG. 10 is a flowchart of detecting light switching in images according to an embodiment of the present invention, which includes the following steps.

$$LSD(q)=\Sigma_{k=1}^{(bn\_x)*(bn\_y)} SAD(k), q=1,2,3,\qquad(8)$$

where bn_x is the number of blocks on the x-axis, and bn_y is the number of blocks on the y-axis. For the example of FIG. 4A, bn_x=bn_y=4. In some embodiments, k=1 represents block (0,0), k=2 represents block (1,0), k=3 represents block (2,0), k=4 represents block (3,0), k=5 represents block (0,1), and so on.

Step S1020: storing, by the light switching detection circuit 830, the LSD(q) in the storage circuit 130 after the LSD(q) is generated.

Step S1030: comparing, by the light switching detection circuit 830, the current light switching indication value (LSD(q)) with the previous light switching indication value (LSD(q−1) which is stored in the storage circuit 130) to generate a light switching indication signal L_ind. More specifically, the light switching detection circuit 830 determines the light switching indication signal L_ind according to equation (9), where lsd_thd is the threshold.

$$L\_ind = \begin{cases} 1, \text{ when } abs(LSD(q)-LSD(q-1)) > lsd\_thd \\ 0, \text{ when } abs(LSD(q)-LSD(q-1)) \le lsd\_thd \end{cases} \qquad(9)$$

It can be seen from equation (8) that the light switching indication value LSD represents the global SAD of an image (i.e., the SAD of the entire image). When the light in the image suddenly changes significantly (e.g., the light in the monitored area is turned on/off), there will be a larger difference between LSD(q) and LSD(q−1). In other words, one of the uses of the light switching indication signal L_ind is to indicate the turning on/off of the light.

Reference is made to FIG. 8. The determination circuit 630 can further determine whether to issue the object movement signal Sig_alm according to the light switching indication signal L_ind. In some embodiments, when the light switching indication signal L_ind is 1, the determination circuit 630 does not issue an object movement signal Sig_alm or makes the object movement signal Sig_alm equal to 0, so as to avoid the misjudge in which the switching of light is mistaken for the presence of a moving object.

In some embodiments, the light switching indication signal L_ind can be used as or used to generate the aforementioned reset signal w_rst. That is, when the light is switched, the weight determination circuit 112 resets the class-A weight w_a (step S540).

In some embodiments, the light switching indication signal L_ind can also be used to reset the background image BG. Specifically, when the light is switched, the device 100 deletes the background image BG in the storage circuit 130 (i.e., deletes the old background image(s)) based on the light switching indication signal L_ind generated by the light switching detection circuit 830, and can reset the count value in the system corresponding to the input image(s) IM so that the device 100 uses the current input image IM as the first background image BG (i.e., similar to restarting). Deleting the old background image(s) can prevent the device 100 from misjudging due to light switching.

In some embodiments, the aforementioned equation (8) can be modified to equation (10) to reduce the amount of data (reduce the usage of the storage circuit 130), where SAD'(k)=SAD(k)/(bs_x*bs_y).

$$LSD(q)=\Sigma_{k=1}^{(bn\_x)*(bn\_y)} SAD'(k), q=1, 2, 3,\qquad(10)$$

People having ordinary skill in the art can design the determination circuit 630, the operation circuit 810, and the light switching detection circuit 830 based on the above discussions. That is to say, the determination circuit 630, the operation circuit 810, and the light switching detection circuit 830 can be application specific integrated circuits (ASIC) or embodied by circuits or hardware such as programmable logic device (PLD).

According to the present invention, the device and method of detecting the movement of object in images perform a pixel-by-pixel operation on the image to update the background image, and performs a block-by-block operation on the image to determine whether there is a moving object. In comparison with the prior art, the present invention is less likely to misjudge. In addition, adjusting the weight over time can bring a higher degree of reliability to the security monitoring system embodying the present invention.

In some embodiments, the order of the steps in the aforementioned flowcharts can be adjusted according to practical operations and can even be executed simultaneously or partially simultaneously.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A device for detecting movement of object in images, comprising:
    a weight determination circuit for determining a plurality of weights according to an input image and a background image, each weight corresponding to a pixel position;
    an image blending circuit for blending the input image and the background image based on the weights to generate an updated background image; and
    an object movement detection circuit for performing a sum of absolute difference (SAD) calculation with the input image and the background image or the updated background image block by block to generate a moving object indication data, and generating an object movement signal according to the moving object indication data and at least one threshold;
    wherein each block comprises a plurality of pixels;
    wherein the input image comprises a target input pixel at a target pixel position, the background image comprises a target background pixel at the target pixel position, the weight determination circuit determines to use a first weight as the weight corresponding to the target pixel position according to a weight threshold and an absolute difference between pixel values of the target input pixel and the target background pixel, and the weight determination circuit further adjusts the first weight when the input image is updated.

2. The device of claim 1, wherein the object movement detection circuit comprises:
    a calculation circuit for calculating a plurality of SADs with the input image and the background image or the updated background image block by block;
    a comparison circuit for generating the moving object indication data according to the SADs and a first threshold; and
    a determination circuit for processing the moving object indication data to generate a statistic value, and generating the object movement signal based on a comparison between the statistic value and a second threshold.

3. The device of claim 2, wherein the determination circuit generates the object movement signal when the statistic value is greater than the second threshold and less than a third threshold.

4. The device of claim 1, wherein the object movement detection circuit comprises:
    a calculation circuit for calculating a plurality of SADs with the input image and the background image or the updated background image block by block;
    a comparison circuit for generating the moving object indication data according to the SADs and a first threshold;
    an operation circuit for performing a morphology opening operation on the moving object indication data; and
    a determination circuit for processing the moving object indication data after the morphology opening operation to generate a statistic value, and generating the object movement signal based on a comparison between the statistic value and a second threshold.

5. The device of claim 1, wherein the object movement detection circuit comprises:
    a calculation circuit for calculating a plurality of SADs with the input image and the background image or the updated background image block by block;
    a comparison circuit for generating the moving object indication data according to the SADs and a first threshold;
    a region selection circuit for selecting a part of the moving object indication data according to a region of interest; and
    a determination circuit for processing the selected part of the moving object indication data to generate a statistic value, and generating the object movement signal based on a comparison between the statistic value and a second threshold.

6. The device of claim 1, wherein the weight determination circuit has a period of time to adjust the first weight after receiving a reset signal.

7. The device of claim 6, wherein when the adjusted first weight is less than a default value, the weight determination circuit uses the default value as the first weight.

8. The device of claim 1, wherein the object movement detection circuit generates a light switching indication signal based on the SAD calculation, and the weight determination circuit resets the first weight according to the light switching indication signal.

9. The device of claim 1, wherein the object movement detection circuit generates a plurality of SADs when performing the SAD calculation, and the object movement detection circuit calculates a current light switching indication value based on the SADs, the object movement detection circuit further generates a light switching indication signal based on the current light switching indication value and a previous light switching indication value.

10. A method of detecting movement of object in images, comprising:
    (A) determining a plurality of weights according to an input image and a background image, each weight corresponding to a pixel position;
    (B) blending the input image and the background image based on the weights to generate an updated background image;
    (C) performing a sum of absolute difference (SAD) calculation with the input image and the background image or the updated background image block by block, and generating a moving object indication data; and (D) generating an object movement signal according to the moving object indication data and at least one threshold;

wherein each block comprises a plurality of pixels;

wherein the input image comprises a target input pixel at a target pixel position, the background image comprises a target background pixel at the target pixel position, step (A) comprising:

(A1) determining to use a first weight as the weight corresponding to the target pixel position according to a weight threshold and an absolute difference between pixel values of the target input pixel and the target background pixel; and (A2) adjusting the first weight when the input image is updated.

11. The method of claim 10, wherein step (C) comprises:
calculating a plurality of SADs with the input image and the background image or the updated background image block by block; and
generating the moving object indication data according to the plurality of SADs and a first threshold.

12. The method of claim 11, wherein step (D) comprises:
(D1) processing the moving object indication data to generate a statistic value; and
(D2) generating the object movement signal based on a comparison between the statistic value and a second threshold.

13. The method of claim 12, wherein step (D2) comprises generating the object movement signal when the statistic value is greater than the second threshold and less than a third threshold.

14. The method of claim 11, wherein step (D) comprises:
selecting a part of the moving object indication data according to a region of interest;
processing the selected part of the moving object indication data to generate a statistic value; and
generating the object movement signal based on a comparison between the statistic value and a second threshold.

15. The method of claim 10, wherein step (A2) comprises having a period of time to adjust the first weight after receiving a reset signal.

16. The method of claim 10 further comprising:
generating a light switching indication signal based on the SAD calculation; and
resetting the first weight according to the light switching indication signal.

17. The method of claim 10, wherein step (C) generates a plurality of SADs, and the method further comprises:
calculating a current light switching indication value based on the plurality of SADs; and
generating a light switching indication signal based on the current light switching indication value and a previous light switching indication value.

18. The method of claim 10 further comprising:
resetting the background image according to a light switching indication signal.

* * * * *